United States Patent
Goossens et al.

[11] Patent Number: 6,158,463
[45] Date of Patent: Dec. 12, 2000

[54] VALVE ARRANGEMENT, IN PARTICULAR ELECTROMAGNETIC VALVE ARRANGEMENT FOR SLIP-CONTROLLED MOTOR VEHICLE BRAKE SYSTEMS

[75] Inventors: André F. Goossens, Rumst; Willy Dewachter, Tisselt; Antoine Rottiers, Londerzeel, all of Belgium; Alois Hoffmann, Eschbrn, Germany

[73] Assignee: Continental Teves AG & Co. OHG, Germany

[21] Appl. No.: 09/284,820

[22] PCT Filed: Oct. 20, 1997

[86] PCT No.: PCT/EP97/05773

§ 371 Date: Jul. 19, 1999

§ 102(e) Date: Jul. 19, 1999

[87] PCT Pub. No.: WO98/17515

PCT Pub. Date: Apr. 30, 1998

[30] Foreign Application Priority Data

Oct. 21, 1996 [DE] Germany ................ 196 43 290

[51] Int. Cl.[7] ................................... F16K 31/06
[52] U.S. Cl. ................ 137/601.14; 137/601.21
[58] Field of Search .............. 137/601.14, 601.2, 137/601.21

[56] References Cited

U.S. PATENT DOCUMENTS

| | | | |
|---|---|---|---|
| 3,476,146 | 11/1969 | Dolter | 137/601 |
| 5,172,724 | 12/1992 | Tsuzuki et al. | |
| 5,261,448 | 11/1993 | Furuya et al. | |
| 5,664,849 | 9/1997 | Burgdorf et al. | 303/116.1 |
| 5,673,980 | 10/1997 | Schwartz et al. | 137/601 |
| 6,003,838 | 12/1999 | Beck | 251/129.15 |

FOREIGN PATENT DOCUMENTS

| | | |
|---|---|---|
| 0 051 800 | 5/1982 | European Pat. Off. . |
| 0 288 252 | 10/1988 | European Pat. Off. . |
| 14 50 477 | 3/1969 | Germany . |
| 38 16 748 | 11/1989 | Germany . |
| 40 30 963 | 4/1992 | Germany . |
| 42 30 393 | 3/1994 | Germany . |
| 43 10 265 | 10/1994 | Germany . |
| 93 19961 | 10/1993 | WIPO . |
| 97 28391 | 3/1997 | WIPO . |

*Primary Examiner*—Stephen M. Hepperle
*Attorney, Agent, or Firm*—Rader, Fishman & Grauer PLLC

[57] ABSTRACT

The present invention relates to a valve arrangement which includes a hydraulically actuatable non-return valve (1) and another, preferably electrically actuatable valve closure member (7), which are both positioned in a valve-accommodating bore (8) of the valve housing (12) in which the valve arrangement is received, wherein both valve closure members (17) cooperate with a valve seat member (4) in the valve housing (12). The non-return valve (1) is configured as a plate-type non-return valve with a flow opening (2) which is aligned coaxially to a first opening (3) of the valve seat member (4). Relative to the first opening (3) at least one bypass opening (5) is provided in the valve seat member (4) which is either closed or opened by a sealing surface (6) located to the side of the flow opening (2) of the non-return valve (1). A compact non-return valve (1) which is especially simple to make is thereby achieved.

7 Claims, 1 Drawing Sheet

VALVE ARRANGEMENT, IN PARTICULAR ELECTROMAGNETIC VALVE ARRANGEMENT FOR SLIP-CONTROLLED MOTOR VEHICLE BRAKE SYSTEMS

TECHNICAL FIELD

The present invention relates to brake systems and more particularly relates to an electromagnetic valve arrangement for slip-controlled automotive vehicle brake systems.

BACKGROUND OF THE INVENTION

German patent application No. 42 30 393 discloses a valve arrangement of the same type which establishes a direct pressure fluid connection (by way of a parallel connection of a spherical non-return valve to another electromagnetically actuatable valve closure member) between a pressure fluid channel connected to a pressure fluid user and another pressure fluid channel connected to the pressure fluid source as soon as the hydraulic opening pressure of the non-return valve exceeds the closing pressure. The spherical non-return valve causes undesirably great structural efforts. Disadvantages are not only due to the overall height of the valve arrangement but also to actions necessary for fixing and sealing the spherical non-return valve.

An object of the present invention is to provide a compact valve arrangement which permits an easy manufacture and assembly and ensures reliability in operation without restrictions.

BRIEF DESCRIPTION OF THE INVENTION

DETAILED DESCRIPTION OF THE PREFERRED EMBODIMENTS

Figure 1:
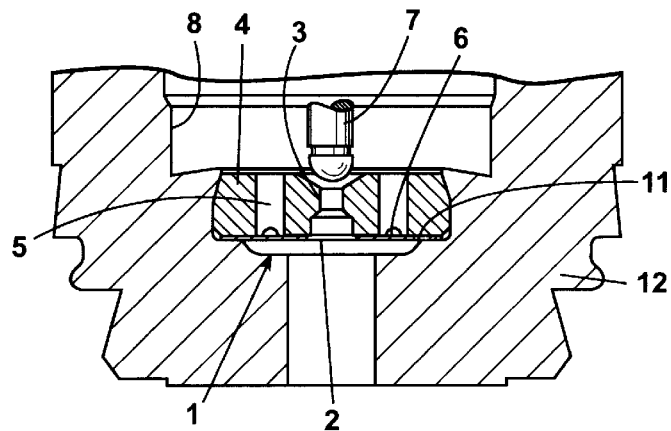
FIG. 1 is a cross-sectional view of the valve arrangement of the present invention.

FIG. 1 shows a considerably enlarged sectional view of a valve arrangement, comprised of a rotationally symmetrical valve housing 12 having a valve-accommodating bore 8 in which a disc-shaped valve seat member 4 and a disc-shaped non-return valve 1 are fastened. The attachment of both parts may preferably be performed by way of calking of the valve housing 12. In the present embodiment, calking of the housing material causes the valve seat member 4 to press the non-return valve 1 against a step of the valve-accommodating bore 8. FIG. 1 shows the closed position of the non-return valve 1 in which the sealing surface 6 facing the valve seat member 4 closes the bypass openings 5 in the valve seat member 4 with its full surface. Exclusively the centrally disposed flow opening 2 in the non-return valve 1 overlaps the opening 3 of the valve seat member 4 which is positioned between the bypass openings 5 in order to establish an unimpeded pressure fluid connection between the pressure chambers placed upstream and downstream of the valve seat member 4 in the open position of the valve closure member 7. The valve closure member 7 is arranged on the valve seat member 4 on the side remote from the non-return valve 1 and, when energized electromagnetically, closes the opening 3 which is bypassed in the presence of a corresponding hydraulic pressure difference on the non-return valve 1 by the sealing surface 6 lifting from the bypass openings 5. A pressure fluid connection between the pressure chambers positioned upstream and downstream of the valve seat member 4 is then permitted by way of the central flow opening 2 and alongside the slot 11 in the non-return valve 1.

Figure 2:
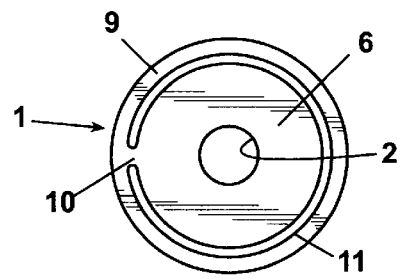
FIG. 2 is a top view of the non-return valve shown in FIG. 1.

With reference to FIG. 1, the embodiment of FIG. 2 shows exclusively the non-return valve 1 according to the present invention in a top view so that the slot 11, which can initially be seen only as a bore in the non-return valve 1 in FIG. 1, is now clearly visible as an opening which extends in the shape of a circle segment. This circle-segment-shaped slot 11 delimits the central portion which forms the actual disc-shaped sealing surface 6 and includes the flow opening 2 as a central opening. Extending at the end of the slot 11 is an elastic web-shaped portion 10 which connects the central portion to a fastening ring 9. Thus, the non-return valve 1 has a first external portion which acts as fastening ring 9 and is connected to the central portion with sealing surface 6 by way of the elastic second web-shaped portion 10. The central portion acts quasi as a resilient tongue, by way of the elastic web-shaped portion 10, in order to lift from the end surface of the valve seat member 4 caused by a hydraulic force applied to it, in conformity with requirements.

With respect to this function, the recess in the valve-accommodating bore 8 downstream of the non-return valve 1 shown in FIG. 1 is furthermore referred to. The diameter of the recess is conformed to the diameter of the central portion limited by slot 11. Adjacent to this diameter is the step of the valve-accommodating bore 8 on which the first external portion abuts which acts as fastening ring 9. The non-return valve 1, illustrated as plate-type non-return valve, is preferably made of spring steel or any comparable heat-treated sheet metal. However, it is also possible to use other alternative materials with corresponding elastic qualities.

Figure 3:
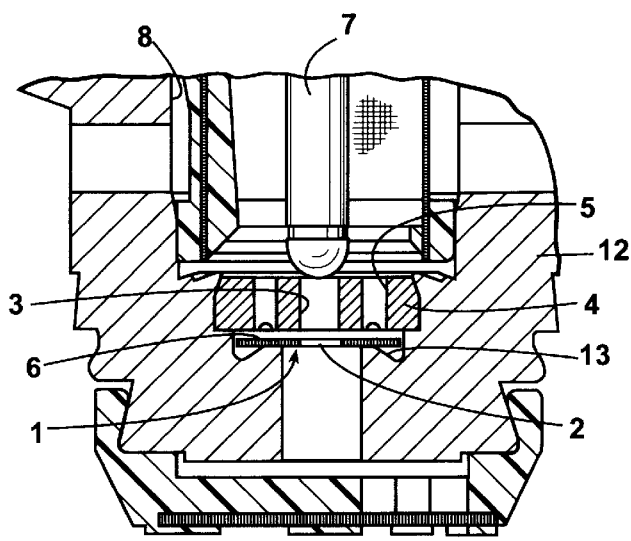
FIG. 3 is an alternative embodiment for arranging a non-return valve in the valve-accommodating member.

FIG. 3 shows an alternative arrangement and embodiment of the non-return valve 1 which has generally a disc-shaped sealing surface 6 which, with its entire surface, is axially movable in the valve housing 12 between the valve seat member 4 and the end portion of the valve-accommodating bore 8. To ensure the free movability of the non-return valve 1 in the valve-accommodating bore 8, said's disc diameter is chosen to be correspondingly smaller than the diameter of the valve-accommodating bore 8. Depending on the respective installation position of the valve arrangement, in the inactive operating position, the non-return valve 1 under the effect of the force of gravity either bears against the annular end portion 13 of the valve-accommodating bore 4 as shown in the drawing, or against the valve seat member 4, with the valve arrangement suspended. Because this non-return valve 1 equally originates from FIGS. 1 and 2, and the flow opening 2 and the opening 3 in the valve seat member 4 are in conformity with each other, there is an unimpeded pressure fluid connection between the pressure chambers on either side of the valve seat member 4 when the valve closure member 7 is open. Opening 3 is closed when the valve closure member 7 is electromagnetically energized so that a pressure fluid connection between the pressure chambers disposed on either side of the valve seat member 4 is permitted by way of the bypass openings 5 and the flow opening 2 in the non-return valve 1 at most due to a hydraulic pressure difference acting on the non-return valve 1.

Figure 4:
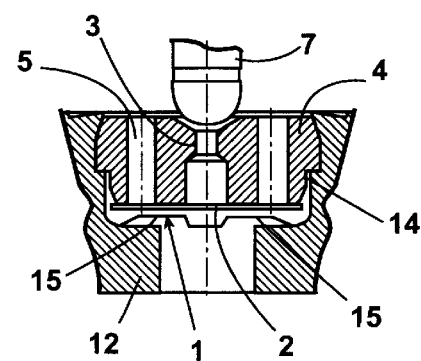
FIG. 4 is an alternative embodiment of the value seat member.

FIG. 4 shows an embodiment of the present invention which is still improved in comparison with FIG. 3.

The plate-shaped non-return valve 1 has the structural shape known from FIG. 3. The valve seat member 4 is also identical to the construction shown in FIG. 3. It should be noted that the non-return valve 1 can be manufactured in a faced and surface-ground finishing operation instead of from an etched rust-proof and surface-ground spring steel. The valve seat member 4 includes a step 14 to facilitate the assembly. Radial grooves 15 in the bottom of the valve housing 12 are directed to the pressure fluid channel and assist the closing speed of the non-return valve 1 especially at cold temperatures. The present construction of the non-return valve 1 is especially appropriate for incorporating a diaphragm function by etching an accurate small hole into the plate structure, which is absolutely unproblematic.

Those details shown in FIG. 4 which have not been referred to can be taken from the embodiments described hereinabove.

Concluding, the present invention is based on the fact that the non-return valve 1 is configured as a plate-type non-return valve with a flow opening 2 which is aligned coaxially to a first opening 3 in the valve seat member 4. At least one bypass opening 5 is arranged relative to the first opening 3 in the valve seat member 4 and is either closed or opened by a sealing surface 6 that is arranged to the side of the flow opening 2 of the non-return valve 1. In terms of function, the non-return valve 1 is arranged on the end surface of the valve seat member 4 remote from the electromagnetically operable valve closure member 7. Valve 1 with its sealing surface 6 is axially movable at least in sections between the valve seat member 4 and a step of the valve-accommodating bore 8.

What is claimed is:

1. Valve arrangement, comprising:

a valve housing;

a hydraulically actuatable non-return valve;

an electrically actuatable valve closure member, wherein said hydraulically actuatable non-return valve and said electrically actuatable valve closure member are both positioned in a valve-accommodating bore of the valve housing, wherein said hydraulically actuatable non-return valve and said electrically actuatable valve closure member both cooperate with a valve seat member in the valve housing, wherein the non-return valve is configured as a plate-type non-return valve with a flow opening which is aligned coaxially to a first opening of the valve seat member, in that relative to the first opening in the valve seat member at least one bypass opening is provided which is either closed or opened by a sealing surface located to the side of the flow opening of the non-return valve.

2. Valve arrangement as claimed in claim 1, wherein the non-return valve is arranged on the end surface of the valve seat member which is remote from the valve closure member.

3. Valve arrangement as claimed in claim 2, wherein the non-return valve with its sealing surface is arranged between the valve seat member and a step of the valve-accommodating bore so as to be axially movable at least in sections.

4. Valve arrangement as claimed in claim 3, wherein the non-return valve has a first portion which acts as a fastening ring and is connected to a central portion including the sealing surface by way of an elastic and web-shaped second portion.

5. Valve arrangement as claimed in claim 4, wherein the central portion is separated from the fastening ring by a slot which extends in a circular segment.

6. Valve arrangement as claimed in claim 5, wherein the elastic and web-shaped second portion connects the central portion to the fastening ring between the ends of the slot.

7. Valve arrangement as claimed in claim 6, wherein the sealing surface includes a central portion which includes a flow opening in its center.

* * * * *